Feb. 16, 1937.　　R. STRINDBERG　　2,070,872

GAS FILTER

Filed Dec. 19, 1934　　4 Sheets-Sheet 1

Inventor
Richard Strindberg
By
Geo. H. Kennedy Jr.
Attorney

Feb. 16, 1937. R. STRINDBERG 2,070,872
GAS FILTER
Filed Dec. 19, 1934 4 Sheets-Sheet 2

Inventor
Richard Strindberg
By Geo. H. Kennedy Jr.
Attorney

Feb. 16, 1937.     R. STRINDBERG     2,070,872
GAS FILTER
Filed Dec. 19, 1934     4 Sheets-Sheet 3

Inventor
Richard Strindberg
By
Geo. H. Kennedy Jr.
Attorney

Feb. 16, 1937. R. STRINDBERG 2,070,872
GAS FILTER
Filed Dec. 19, 1934 4 Sheets-Sheet 4
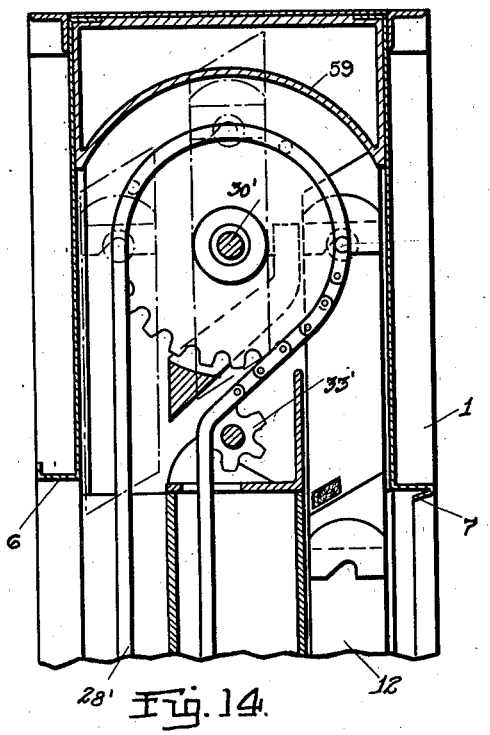
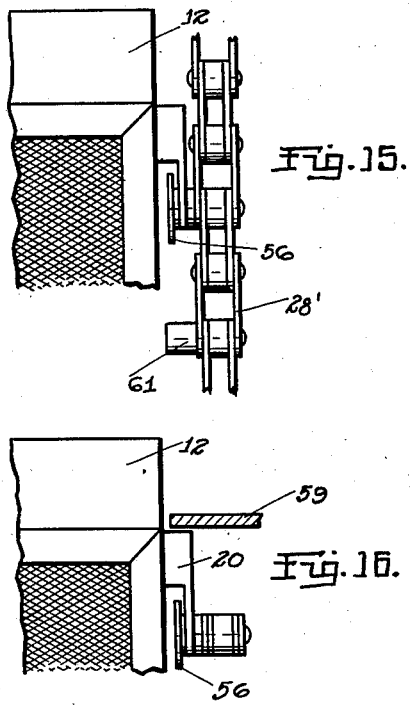
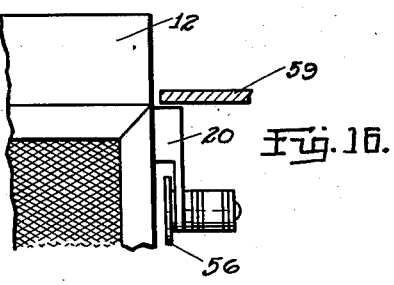
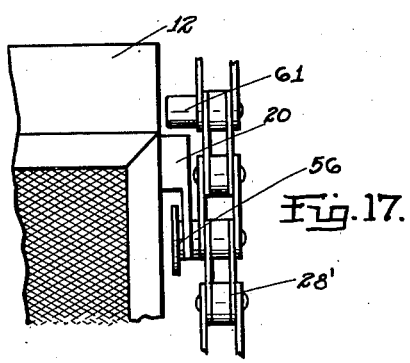
Inventor
Richard Strindberg
By
Geo. H. Kennedy Jr.
Attorney Patented Feb. 16, 1937

2,070,872

UNITED STATES PATENT OFFICE 2,070,872

GAS FILTER

Richard Strindberg, Worcester, Mass., assignor to Development Associates, Inc., Worcester, Mass., a corporation of Massachusetts Application December 19, 1934, Serial No. 758,284

17 Claims. (Cl. 183—9)

The present invention relates to air filters and more especially to filters of the impingement type in which foreign matter is removed from the air passing through the filter by entrapment in an oil film on the material forming the filter.

In prior devices of this character impingement members in the form of baffle plates are carried by a vertical conveyor so positioned that the plates, when at the lower end of the conveyor, will be submerged in a tank of a suitable liquid for the removal of the accumulated dust from said plates, said liquid also providing a clean film of liquid on said plates for the entrapment of dust and other foreign matter when said plates again become operative. The air being filtered passes twice through the filter curtain made up of the baffle plates and the curtain is normally arranged so that the plates are moving upwardly on the intake side of the filter, and, as the air passes through the curtain the second time, said plates are moving downwardly toward the tank of liquid. With the curtain moving in this direction the air which has been already filtered by its first passage through the curtain is carried, during the second passage therethrough, over the baffle plates which have already accumulated dirt and other foreign matter as a result of the air passing thereover while said plates were on the upwardly moving part of the curtain. The air, in its passage over these already somewhat dirty plates, frequently picks up some of the foreign matter therefrom so that the air on the discharge side of the filter is not completely free from dirt.

If the filter curtain were moved in the opposite direction, however, that is, with the curtain moving upwardly on the discharge side of the filter, the liquid on said baffle plates might be entrained in the air and carried beyond said filter. The principal object of the present invention is to avoid the objections noted by providing a filter in which the filtering units forming the curtain move upwardly on the discharge side of the filter, and after being coated with dirt and other foreign matter from the air, are carried downward to the cleaning tank on the intake side of said filter, thereby avoiding the possibility of unclean air being discharged from the filter. In addition, the present invention provides for the thorough draining of the filter units before they are moved into filtering position, thereby avoiding the entrainment of liquid by the cleaned air as it passes through the filter.

Other and further objects and advantages of the invention will more fully appear from the following detailed description taken in connection with the accompanying drawings in which—

Fig. 13 is a fragmentary vertical sectional view corresponding to Fig. 12, showing a detail.

Fig. 14 is a fragmentary vertical section along the line 14—14 of Fig. 1.

Fig. 15 is a side elevation showing the manner in which the filter unit is engaged by the conveyor chain.

Fig. 16 is a view similar to Fig. 15 when the filter unit is at the top of its movement.

Fig. 17 is a view corresponding to Figs. 15 and 16 with the supporting means on the conveyor chain located on the forward side of the upper supporting sprocket for the chain.

Like reference characters refer to like parts in the different figures.

Figure 1:
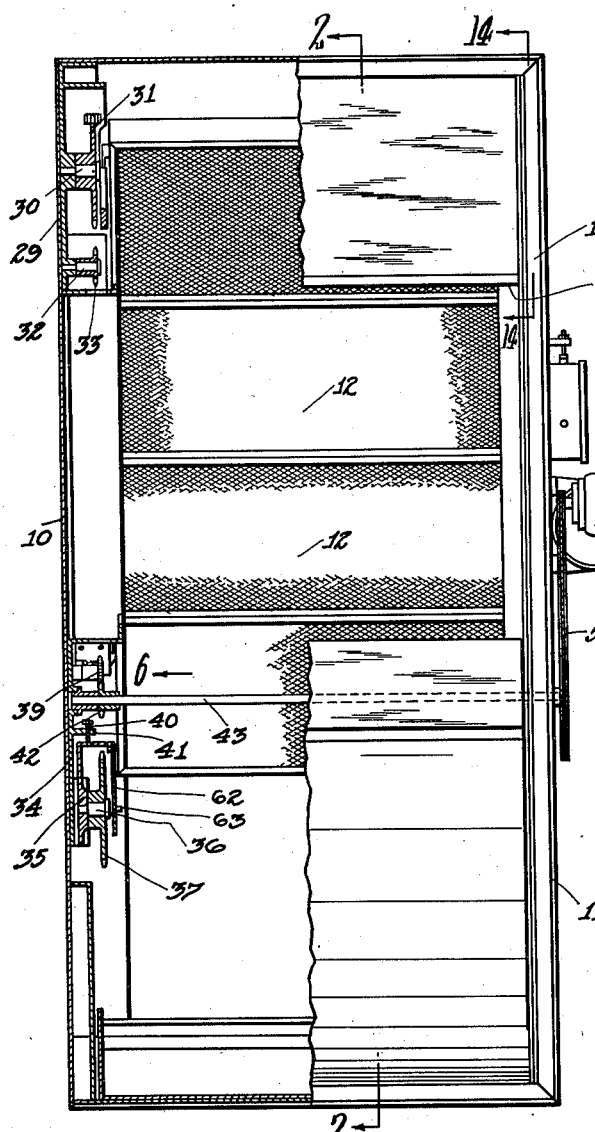
Fig. 1 is an elevation of a filter assembly embodying the invention, parts being broken away to show certain details.
Figure 2:
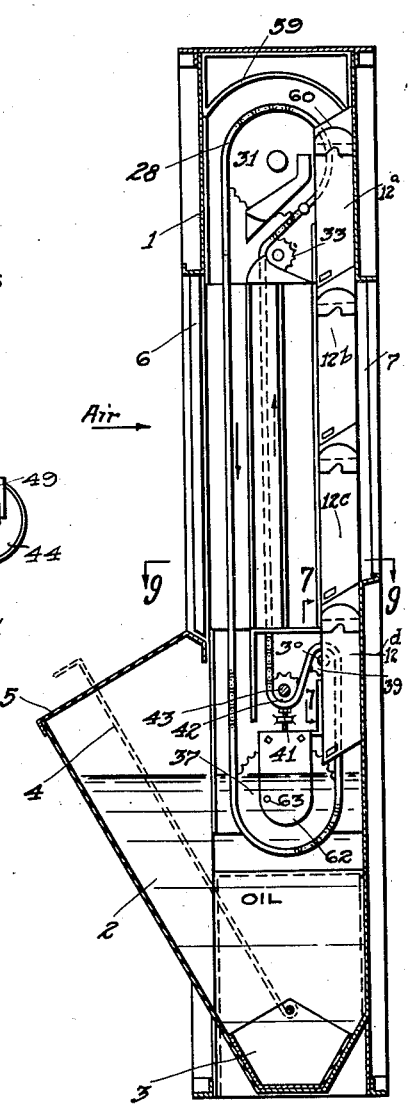
Fig. 2 is a vertical section along the line 2—2 of Fig. 1.

Receiving first to Figs. 1 and 2, the device comprises a casing 1 having a tank 2 at the bottom thereof to receive the liquid in which the filter units are washed and which forms a film on the material of the filter units for the entrapment of dirt and other foreign matter in the air as it passes through the units. A pan 3 positioned in the bottom of the oil tank has a handle 4 by which said pan may be withdrawn for removal of the dirt and other foreign matter collected in said pan from the filter units, a cover 5 normally closing the opening in the casing 1 through which said pan is removed. The casing has alined openings 6 and 7 on opposite sides thereof for the intake and exhaust of air through said filter, said openings being positioned above the tank and being spaced from the top of the casing.

Figure 9:
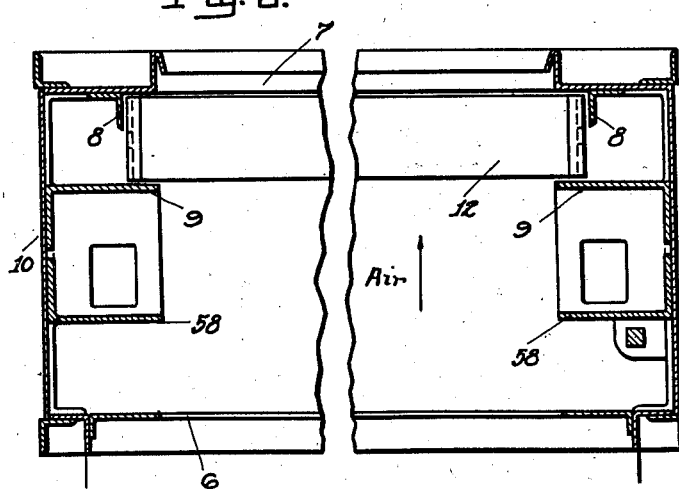
Fig. 9 is a horizontal section along the line 9—9 of Fig. 2.

Within the casing 1 and adjacent to the discharge opening thereof, is provided a vertical guideway defined by angle bars 8, Fig. 9, positioned on opposite sides of the opening 7 and by vertically extending plates 9 extending inwardly from the opposite side walls 10 and 11 of the casing. A plurality of filter units or cells 12, hereinafter more fully described, are vertically slidable in the guideway and are held in covering relation to the discharge opening 7, as best shown in Figs. 2 and 9, so that air pasing through the filter and out the discharge opening 7 must pass through said filter cells.

Figure 3:
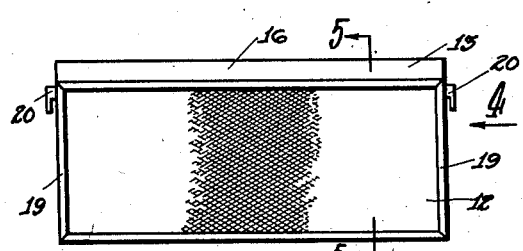
Fig. 3 is a front elevation of one of the filter units.
Figure 4:
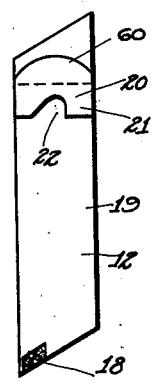
Fig. 4 is a side elevation of said unit.
Figure 5:
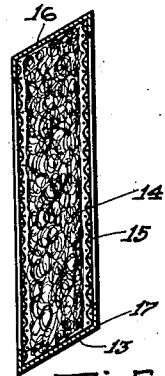
Fig. 5 is a vertical section through said unit along the line 5—5 of Fig. 3.

Each filter cell 12, as best shown in Figs. 3, 4 and 5, has a box-like frame 13 open at front and back thereof, said frame being filled with any suitable filtering material such as steel wool 14, the latter being held in position by screens 15 positioned at the front and back of said frame. The top and bottom walls 16 and 17 of the cell extend in parallel relation to each other and at a substantial angle to the horizontal to provide for a wedging action between adjacent filter cells when they are positioned one above the other in the guideway, as shown in Fig. 2. Openings 18 are provided adjacent the lowermost corners of the end walls 19 of each frame to provide for draining therefrom of the fluid in which said units or cells are dipped. Each end wall 19 of the cell has a lug 20 adjacent the top thereof by which said frame is supported in the casing. Each of said lugs has a depending flange 21 spaced from the wall 19, said flange having a notch 22 therein for a purpose which will be apparent.

By the wedging action of the cells as a result of the inclined upper and lower surfaces the filter is adapted for use in installations where the air passes through the filter with a pulsating action as in compressors or combustion engines. The pulsating action would normally cause a vibration of the cells, causing noise, and eventually injuring the cells; this vibration is entirely eliminated by the tight fit of the cells in the guideway as a result of the wedging action, as will be apparent.

Figure 7:
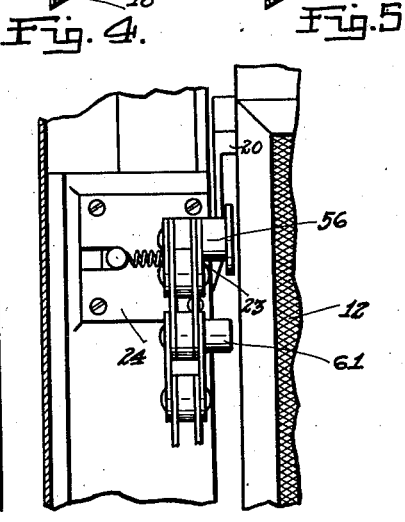
Fig. 7 is a side elevation of the mechanism of Fig. 6.
Figure 8:
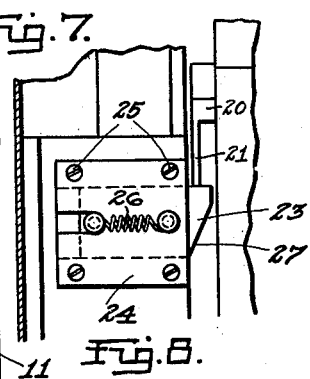
Fig. 8 is an elevation of a latch partially shown in elevation in Fig. 7.

As shown in Figs. 1 and 2, a plurality of filter cells 12 are stacked, one above the other, in the guideway provided by the casing and said stacked cells are supported in said guideway by a pair of latches 23, Figs. 7 and 8, engageable beneath the lugs 20 of the lowermost unit. Each of said latches is horizontally slidable in a bracket 24 secured by screws 25 to the wall of the casing below the opening 7, said bracket providing a guideway in which the latch is slidable. A coil spring 26 urges the latches into supporting position and the forward edge 27 of said latch is beveled to allow the cells to be carried upwardly past said latch when the filter cells which have been in use are replaced by clean cells.

As the filter cells adjacent to the discharge opening 7 become clogged with dirt and other foreign matter the stack of cells is shifted upwardly and the uppermost cell is removed and carried downwardly and into the oil bath for the removal of the impurities thereon. The movements of the filter cells are procured by a pair of conveyor chains 28 and 28', Figs. 2 and 12, positioned adjacent the opposite end walls of the casing. Since each conveyor chain and its supporting mechanism is a substantial duplicate of the other, only one will be described. Referring to Figs. 1 and 2, a bracket 29, secured to the end wall 10 of the casing supports a stub shaft 30 on which a large sprocket 31 is journaled, the latter supporting the upper end of the conveyor chain 28. Said bracket 29 also has a shaft 32 in vertical alinement with the shaft 30 on which a small sprocket 33 is mounted, said sprocket provided for holding the upwardly moving side of the conveyor chain in spaced relation to the discharge side of the filter casing.

A bracket 34 secured to the end wall of the casing below the intake and discharge openings has a vertically adjustable support 35 thereon which carries a stub shaft 36 for a sprocket 37 corresponding in diameter to the sprocket 31, said sprocket 37 supporting the lower portion of the conveyor chain. A shaft 38 is also supported by the bracket 34 above and rearwardly of the shaft 36, said shaft 38 supporting a small idler sprocket 39 over which the conveyor chain passes. Vertical adjustment of the support 35 which provides for maintaining the conveyor chain tight, is effected by a bolt 40 passing through a lug 41 on the bracket 34 and engaging with the support 35.

Figure 11:
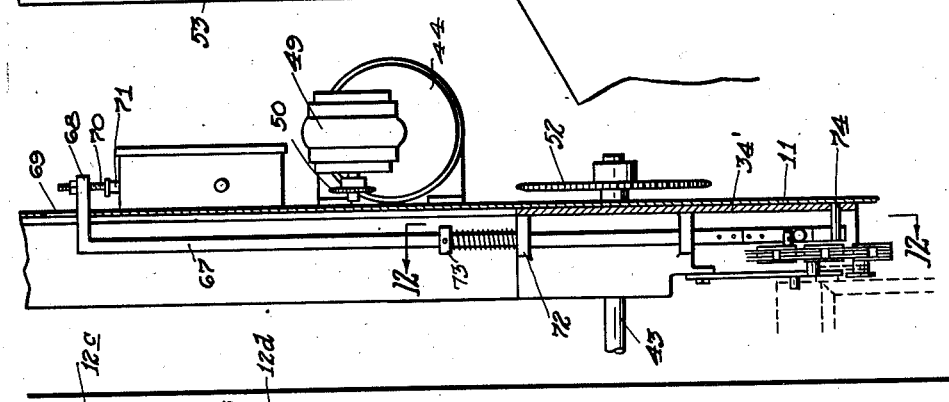
Fig. 11 is a sectional view along the line 11—11 of Fig. 10.

The conveyor chain is driven by a small sprocket 42 secured to a shaft 43 extending horizontally through the filter casing, said shaft being journaled in the bracket 34 and also in the corresponding bracket 34', Fig. 11, secured to the opposite end wall of the casing. Said shaft is located in vertical alinement with the shaft 36 and below the shaft 38 so that the conveyor chain, after passing around the lower sprocket 37 and the idler sprocket 39, passes forwardly and downwardly around the driving sprocket 42 and thence vertically upward to and around the idler sprocket 33, from which said chain passes directly to the upper carrying sprocket 31. The downward pass of the conveyor chain is direct from the upper sprocket 31 to the lower sprocket 37.

Figure 12:
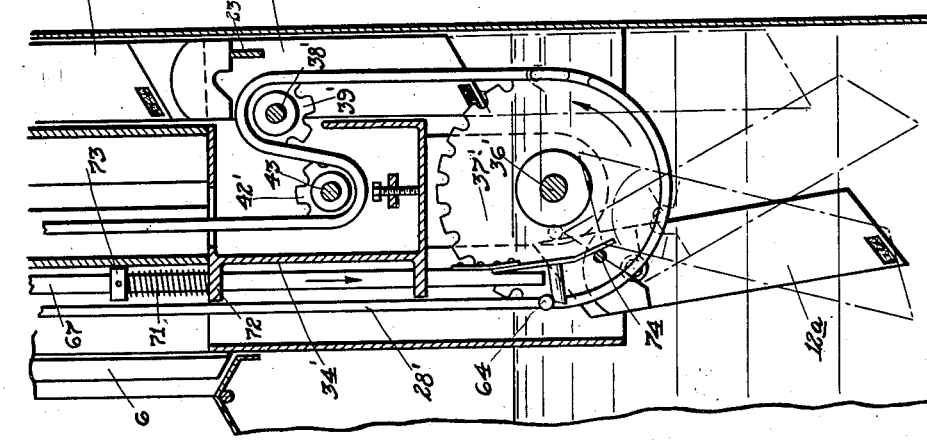
Fig. 12 is a vertical section substantially along the line 12—12 of Fig. 11.

The conveyor chain 28', Fig. 12, is supported at its lower end in a similar manner by the large sprocket 37', the smaller sprocket 39' on the shaft 38, and the sprocket 42' on the driven shaft 43. The shaft 36' for the sprocket 37' is mounted in a manner similar to that of shaft 36.

Figure 10:
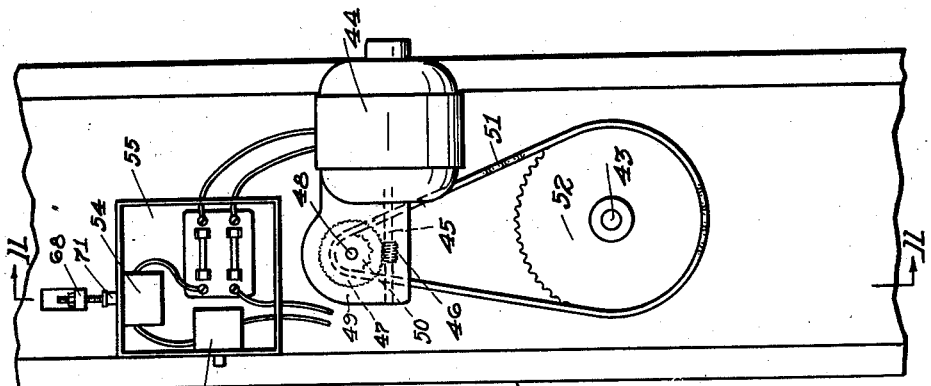
Fig. 10 is a fragmentary elevation of a part of the actuating mechanism for the conveyor chain.

The conveyor chain is driven by an electric motor 44, Figs. 10 and 11, to the shaft 45 of which is secured a worm 46 meshing with the worm gear 47 on a shaft 48 journaled in a bracket 49 secured to the end wall of the casing. The shaft 48 also carries a sprocket 50 engaging with a chain 51 which passes around a large sprocket 52 on the end of the shaft 43. Thus, as the motor operates, the conveyor chains at the opposite ends of the casing are driven in the direction indicated by the arrows in Fig. 2.

The operation of the motor is controlled by a manually actuated switch 53 and by an automatically actuated switch 54, both located in a control box 55 secured to the filter casing, the switch 53 providing for starting of the motor and the switch 54 stopping said motor when the conveyor chain reaches a predetermined point. Both the switches 53 and 54 are of a well known push button type and need not be described in detail.

Figure 6:
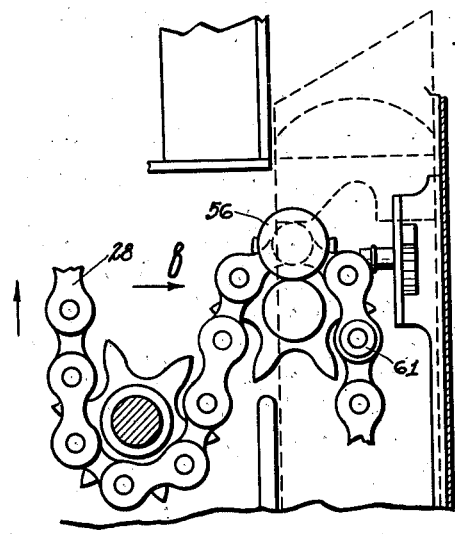
Fig. 6 is a fragmentary elevation, on an enlarged scale, of a part of the conveyor chain for the units.

For advancing the filter cells each conveyor chain 28 and 28' has on the inside thereof a headed pin 56, Figs 6 and 7, which is engageable in the notch 22 in the lug 21 on the units. The headed pins on the opposite chains are in the same relative position so that as the chains pass diagonally upward from the sprockets 33 around the large sprockets 31, said pins engage with the notches at the opposite ends of the uppermost filter cell, thereby elevating said cell and carrying it around the upper sprocket and downwardly adjacent the intake side of the filter casing into the oil bath. The filter cell is suspended from said pins and hangs in the vertical position shown until it reaches the oil bath, said cell being guided against swinging during its downward movement by plates 58 secured to the end walls of the casing. To prevent the cells from being released from the headed pin, each of the brackets 29 has an arcuate plate 59 positioned above and in spaced relation to the sprocket 31 for engagement with the arcuate surface 60 provided on the upper edge of each of the lugs 20. As the uppermost cell begins its downward movement a pin 61 on each conveyor chain, and located in back of the headed pin 56, moves into position directly above the lug 20 and prevents the headed pin from being disengaged from the notch 22.

When the cell being carried by the conveyor chain reaches the lower sprocket 37 it is completely submerged in the oil bath, as will be apparent. To insure a complete cleaning of the cell and the removal of all impurities collected thereon, the cell is oscillated while in the oil bath. To this end the bracket 35 has a depending plate 62 positioned on the inner side of the sprocket 37 and said plate has a projecting pin 63, which as best shown in Figs. 12 and 13, is in the position to engage with the uppermost corner of the cell as it approaches its lowermost position, thereby procuring first a counterclockwise swinging of the cell and as the corner of said cell passes beyond said pin permits said cell to swing back into its vertical position. During this time the cell is prevented from jumping off of the headed pins 56 by the arcuate lower edge of the plate 62 which is located just above the surfaces 60 of the lugs 20.

After passing through the oil bath the cell is carried upwardly into alinement with the stack of cells and continued operation of the conveyor chain elevates the entire stack of cells, advancing the cell carried by said chain into the position of the filter cell 12d, in which position said cell is supported by the latches 23 above described. In this position, as will be apparent, the entire cell is located below the discharge opening 7 and is given an opportunity to drain thoroughly before its subsequent advance into air filtering position. The upward movement of this cell elevates all of the cells thereabove, thereby removing the cell which has been in operation the greatest length of time into the position of the cell 12a in readiness for removing during the continued operation of the chains. When the cells in the stack are advanced into air-intercepting position, any excess liquid not previously drained, passes out through the opening 18 and returns to the tank in a path which is substantially out of the air stream through the filter.

Where the air being filtered is extremely dirty so that the cells collect a large amount of dust and other foreign matter, the conveyor chain is stopped when the cell carried thereby is immersed in the oil bath to allow the cell to remain in the oil bath for a more complete removal of the impurities therein. To this end the conveyor chain 26' carries an outwardly projecting pin 64 spaced lengthwise of the chain a short distance back of the headed pin 56 for engagement with a lug 65 secured to a flat spring 66 on the lower end of a rod 67 vertically slidable in the bracket 34' secured to the end wall 11. The rod 67 has a lug 68 thereon extending through an opening 69 in the end wall 11 and the lug 68 has a screw 70 vertically adjustable therein, the head of said screw being in alinement with the switch button 71 of the switch 54. The rod 67 is normally held in the position of Figs. 11 and 12 by a coil spring 71 surrounding said rod and positioned between a lug 72 on the bracket 34' and a collar 73 secured to said rod. As the pin 64 moves downwardly into engagement with the lug 65 it procures a downward movement of the rod 67 and accordingly opens the switch 54 to stop the motor 44 and accordingly to stop the movement of the conveyor chains. The conveyor chain may be subsequently started after the cell has been immersed a suitable length of time either by manual operation of the switch 53 or by suitable automatic actuation thereof, as by a time clock or the like. When the conveyor chain is again started a pin 74, Fig. 11, extending inwardly from the bracket 34', engages the lower end of the spring 66 to swing the lug 65 out of alinement with the pin 64 and allow the latter to pass said lug.

The operation of the device which no doubt will be clear from the foregoing, will be briefly summarized. With the conveyor chains both stopped, and with one of the cells immersed, as shown in Fig. 12, the shifting of the cells is effected by closing of the switch 53, thereby starting the motor 44 in operation. The corresponding movement of the conveyor chains carries the immersed cell downwardly so that the uppermost corner thereof passes the pin 63 so that the cell is given a swinging movement in the liquid and is then carried upwardly by the chain, first into the dot-dash line of Fig. 12 into vertical alinement with the stack of cells, and then into the position of the cell 12d, said cell 12d, and the cells 12b and 12c thereabove being advanced into the positions of cells 12a, 12b and 12c respectively. Before this upward movement, the uppermost cell of the stack which occupies the position of the cell 12a was previously removed by the chain and carried down into the oil bath. It may be noted in this connection that in the showing of Figs. 1 and 2 the headed pins 56 on the conveyor chains are on the upward pass of said chain and are about to move into engagement with the uppermost cell 12a for the removal of said uppermost cell from the stack, and in Fig. 12 the pin 56 is shown supporting said uppermost cell 12a after it has been removed from the stack and carried downwardly by the chains into the oil bath.

When the chains start their movement from the position of Fig. 12, the lug 65 is shifted out of alinement with the pin 64 as above described. As the cell carried by the conveyor chain is moved upwardly into the position of 12d the latches engage beneath the lugs 21 to support the stack of cells. The movement of the conveyor chains around the sprockets 24 and downwardly around the idler sprocket 25 withdraws the headed pins from the notches 22 to allow the conveyor chain to continue its operation without further effect on the cell until said headed pin during its movement from the idler sprocket 33 toward and around the upper large sprocket 31, engages in the notches of the uppermost cell of the stack and carries said cell downwardly, as will be apparent, into the oil bath where the chain is brought to rest with the cell submerged by engagement between the pin 64 and lug 65 with the resultant opening of the switch 54, as above described.

From the foregoing it will be apparent that as the device operates, the filter cell which has been in air intercepting position for the longest period of time will be removed and carried downwardly to cleaning and draining position on the intake side of the filter so that dust or other foreign matter which may inadvertently be dislodged from said cell during its downward movement to the oil bath will necessarily be removed by the filter units on the discharge side of the filter casing. Furthermore, since each cell is given an opportunity to drain before it is moved upwardly into air intercepting position, there is no possibility for the entrainment of oil by air passing through the filter. Efficient cleaning action is thus obtained without the objectionable entrainment of oil and without the possibility of entrainment of dust from the filter cells.

I claim:

1. In a filter construction, a casing having a liquid tank adjacent to the bottom thereof, a plurality of filter cells positioned in said casing, means for carrying each of said cells successively through the liquid in the tank, and means for oscillating each cell while it is submerged in the tank.

2. In a filter construction, a casing having a liquid tank adjacent to the bottom thereof, a plurality of filter cells positioned in said casing, means for carrying each of said cells successively through the liquid in the tank, and means for oscillating each cell while it is submerged in the tank, said last means comprising a member secured to the casing and engageable with a portion of the frame of each cell as it passes thereby.

3. In a filter construction, a casing, a plurality of filter cells positioned within said casing, conveyor means for removing each of said cells successively from air intercepting position and carrying said cells through a tank of liquid in said casing, and means for automatically bringing said conveyor means to rest when each cell is submerged in the tank.

4. In a filter construction, a casing having a tank of liquid therein, a plurality of filter cells positioned within the casing, conveyor means for removing each of said cells successively from air intercepting position and for carrying said cells through the tank, said conveyor means and said cells having cooperating means by which said cells are releasably connected to said means, and automatic means for bringing said conveyor means to rest when the cell carried thereby is submerged in the tank.

5. In a filter construction, a casing, a plurality of filter cells positioned in said casing in stacked relation, a conveyor chain having means thereon for releasably engaging each of said cells, means for supporting said chain to provide for removal of said cells, one by one, from one end of the stack and for the positioning of each of said cells at the opposite end of said stack and means provided by the casing and conveyor mechanism for locking said cells to the conveyor mechanism during movement thereof.

6. In a filter construction, a casing having a guideway therein and a plurality of filter cells positioned in stacked relation in said guideway, the opposite surfaces of said cells extending at an angle to the normal transverse plane of the cells to provide for a wedging action of said cells in the guideway, said stack of cells being supported against downward movement by the lowermost cell of said stack.

7. In a filter construction, a casing having a vertical guideway therein, a plurality of filter cells positioned in stacked relation in said guideway, the opposite surfaces of said cells extending at an angle to the normal transverse plane of the cells to provide for a wedging action of said cells in the guideway, said stack of cells being supported against downward movement by the lowermost cell of said stack, and means for intermittently advancing said stack of cells in the guideway.

8. In a filter construction, a casing, a plurality of filter cells positioned within said casing, conveyor means for removing each of said cells successively from air intercepting position and carrying said cells through a tank of liquid in said casing, and means for automatically bringing said conveyor means to rest when the moving cell reaches a predetermined position.

9. In a filter construction, a casing having alined intake and discharge openings, a guideway adjacent to the discharge opening, a plurality of filter cells supported in said guideway in stacked relation, a conveyor chain for removing the endmost of the filter cells from the stack, carrying it through a liquid bath and returning it to the opposite end of the stack, and means for supporting said stack with the returned cell entirely out of alinement with the discharge opening and beneath said opening to prevent entrainment of the liquid on the cell by the air stream.

10. In a filter construction, a casing, means within said casing for supporting a plurality of individual filter cells in stacked relation, and a conveyor mechanism having means for releasably engaging each of said cells for withdrawing the latter from the stack and returning said cell to said stack at the opposite end thereof, said cells and conveyor mechanism having cooperating means for locking said cell against release from said mechanism during the movement of each cell from one end of the stack to the other.

11. In a filter construction, a casing, means within said casing for supporting a plurality of individual filter cells in stacked relation, and a conveyor mechanism having means for releasably engaging each of said cells for withdrawing the latter from the stack and returning said cell to said stack at the opposite end thereof, said cells and conveyor mechanism having cooperating means for locking said cell against release from said mechanism during the movement of each cell from one end of the stack to the other, said cooperating means being automatically releasable when the cell is returned to the stack.

12. In a filter construction, a casing, means within said casing for supporting a plurality of filter cells in stacked relation, and a conveyor mechanism having means for releasably engaging each of said cells successively for withdrawing the latter from the stack and returning said cell to the stack at the opposite end thereof, each of said cells having a lug thereon engageable with the means on the conveyor mechanism, and means in the casing and on the conveyor mechanism for locking the cells against release from the mechanism during the movement of said cell from one end of the stack to the other.

13. In a filter construction, a casing, means within said casing for supporting a plurality of filter cells in stacked relation, and a conveyor mechanism having means for releasably engaging each of said cells successively for withdrawing the latter from the stack and returning said cell to the stack at the opposite end thereof, each of said cells having a lug thereon engageable with the means on the conveyor mechanism, and means in the casing and on the conveyor mechanism for locking the cells against release from the mechanism during the movement of said cell from one end of the stack to the other, said locking means being automatically releasable when the cell is returned to the stack.

14. In a filter construction, a casing having alined intake and discharge openings, a vertical guideway adjacent to one of said openings, a plurality of filter cells positioned in superposed relation in said guideway and in alinement with the openings, and means for advancing said cells through a liquid bath to said guideway, said cells being arranged to provide for drainage of the liquid at the ends only of said cells in a path substantially out of the air stream.

15. In a filter construction, a casing, means within said casing for supporting a plurality of filter cells in stacked relation, a conveyor mechanism having means for releasably engaging each of said cells successively for withdrawing the latter from the stack and for returning the cell to said stack at the opposite end thereof, said stack of cells being located adjacent to the air discharge opening in the casing, and means provided by the casing and conveyor mechanism for locking said cells to the conveyor mechanism during movement of said cells.

16. In a filter construction, a casing, means within said casing for supporting a plurality of filter cells in stacked relation, means in the casing and engageable with the lowermost cell of the stack to support said stack against downward movement, a conveyor chain having means for releasably engaging each of said cells, and means supporting said chain to provide for engagement between the chain and the uppermost cell of the stack and to release the chain from said cell when it is returned to the lowermost end of the stack, said stack of cells being located adjacent to the air discharge opening in the casing, and means provided for the casing and the conveyor chain for locking said cells to the conveyor chain during movement of said cells.

17. In a filter construction, a casing, means within said casing for supporting a plurality of filter cells in stacked relation, means in the casing and engageable with the lowermost cell of the stack against downward movement, a conveyor chain at each side of the casing, each chain having means for releasably engaging each of said cells successively for withdrawing the cell from the stack at the uppermost end and for returning the cell to said stack at the lowermost end, means for supporting each chain to provide for engagement between said chain and the uppermost cell and to provide for release of said chain from the cell when it is returned to the lower end of the stack, said stack of cells being located adjacent to the air discharge opening in the casing, and means provided by the casing and conveyor chain for locking said cells to the chain during movement of said cells.

RICHARD STRINDBERG.